(12) United States Patent
Ben-Yaakov

(10) Patent No.: US 7,084,584 B2
(45) Date of Patent: Aug. 1, 2006

(54) LOW FREQUENCY INVERTER FED BY A HIGH FREQUENCY AC CURRENT SOURCE

(75) Inventor: Shmuel Ben-Yaakov, Beer-Sheva (IL)

(73) Assignee: Ben-Gurion University Negev Research and Development Agency, Beer-Sheva (IL)

( * ) Notice: Subject to any disclaimer, the term of this patent is extended or adjusted under 35 U.S.C. 154(b) by 0 days.

(21) Appl. No.: 10/502,249

(22) PCT Filed: Jan. 30, 2003

(86) PCT No.: PCT/IL03/00074

§ 371 (c)(1),
(2), (4) Date: Dec. 27, 2004

(87) PCT Pub. No.: WO03/065556

PCT Pub. Date: Aug. 7, 2003

(65) Prior Publication Data

US 2005/0110431 A1 May 26, 2005

(30) Foreign Application Priority Data

Jan. 31, 2002 (IL) .................................. 147944

(51) Int. Cl.
*G05F 1/00* (2006.01)
(52) U.S. Cl. ........................ 315/291; 315/307
(58) Field of Classification Search ............ 315/291, 315/224, 307, 209 R, 244
See application file for complete search history.

(56) References Cited

U.S. PATENT DOCUMENTS 5,225,742 A 7/1993 Beasley
5,500,792 A * 3/1996 Jeon et al. .................... 363/98

(Continued)

FOREIGN PATENT DOCUMENTS

GB 2320627 A 6/1998

(Continued)

OTHER PUBLICATIONS

International Search Report for corresponding PCT application (2 pages).

*Primary Examiner*—Wilson Lee
*Assistant Examiner*—Minh Dieu A
(74) *Attorney, Agent, or Firm*—Roach Brown McCarthy & Gruber; Kevin D. McCarthy

(57) ABSTRACT

Apparatus driven by high-frequency AC current source, for driving an electric load with low-frequency AC current, that comprises a current splitting inductor, for generating, from the high-frequency current source, a first and a second high-frequency AC current sources; a rectifier, coupled to the splitting inductor, consisting of rectifying diodes for rectifying the first and second high-frequency current sources, and capacitors, charged by the diodes, the capacitors being corresponding to the first and second DC current sources; a controllable half-bridge commutator having a first and a second control inputs, the commutator being coupled to the DC current sources, for commutating the DC current sources, for allowing to generate, from the DC current sources, the low-frequency AC current required for driving the electric load; and a control circuitry, having a first and a second outputs, the outputs being coupled to the first and second control inputs, respectively, and outputting two complimentary pulse trains, each of which having a frequency being automatically adjusted according to the operating conditions of the electric load, for controlling the switching time of the commutator, thereby causing the commutator to alternately change the direction of the current passing through the electric load.

18 Claims, 7 Drawing Sheets

U.S. PATENT DOCUMENTS

| | | |
|---|---|---|
| 6,038,148 A | 3/2000 | Farrington et al. |
| 6,075,715 A * | 6/2000 | Maehara et al. ............... 363/37 |
| 6,246,181 B1 * | 6/2001 | Naruo et al. ............. 315/209 R |
| 6,333,606 B1 * | 12/2001 | Lee et al. ................... 315/291 |
| 6,429,603 B1 | 8/2002 | Tsugita et al. |
| 6,545,431 B1 | 4/2003 | Hui et al. |

FOREIGN PATENT DOCUMENTS

| | | |
|---|---|---|
| JP | 2000262069 A2 | 9/2000 |
| WO | WO 00/54398 A1 | 9/2000 |
| WO | WO 01/67828 A1 | 9/2001 |
| WO | WO 0167828 A1 | 9/2001 |

* cited by examiner

LOW FREQUENCY INVERTER FED BY A HIGH FREQUENCY AC CURRENT SOURCE

FIELD OF THE INVENTION

This application is a 371 of PCT/IL03/00074 filed Jan. 30, 2003.

The present invention relates to the field of power switching inverters. More particularly, the present invention relates to a method and apparatus for generating a low frequency AC current for driving linear or nonlinear loads, and in particular for driving arc type lamps commonly known as High Intensity Discharge (HID) lamps.

BACKGROUND OF THE INVENTION

Currently, there are several types of switch mode converters and inverters, which are widely used for DC-to-DC, DC-to-AC, AC-to-DC and AC-to-AC power conversion. Currently, there are loads, the operation of which is optimized and efficiency maximized, if driven by special drive signal. For example, High Intensity Discharge (HID) lamps need to be driven by a low frequency AC signal, because high-frequency drive signal may destabilize the lamp's arc due to existence of acoustic resonance, which is a known phenomenon in the art. Accordingly, an inverter driving an HID lamp must have a current source nature (as opposed to voltage source nature) such that its characteristics contribute to the stability of the lamp's arc. One way to implement a low-frequency driver is to utilize electromagnetic ballast that is based on a large inductor, which is placed in series with the power line voltage. An alternative and preferred approach is to generate the low frequency signal by a switch mode inverter. A typical prior art solution is illustrated in FIG. 1.

FIG. 1 depicts a line rectifier (1), a power factor correction section (PFC), a buck converter that comprises a power switch $Q_B$, a stirring diode D1, an inductor Lf and a filtering capacitor Cf. The buck converter is controlled to operate as a current source by utilizing a feedback loop (not shown). The controlled DC current (I) is then fed to a commutator that is implemented by a full-bridge inverter (Q1 to Q4), and, therefore the lamp is driven by AC signal. Ignitor 2 is normally placed in series with lamp 3, in order to allow providing to the lamp the high-voltage spike that is required for its ignition phase. The circuit's configuration shown in FIG. 1 fulfills the lamp requirements in terms of ignition and low-frequency AC current. However, this implementation is rather expensive since it requires 5 power switches (in addition to the switches in the PFC circuitry) and an ignitor. Another drawback of this implementation is, that the power transistors are 'hard-switched' (i.e., they are switched between states while being under voltage) and, therefore, will have high switching losses. The problem of switching losses associated with the Buck section (i.e., Qb) is acute, because the Buck switch should preferably be operated at a high switching frequency. Another drawback associated with the configuration of FIG. 1 is that the spike-type ignition voltage restricts the distance between the ballast and the lamp, because short pulses, such as an ignition voltage pulse, decay rather fast as a function of their travel distance.

FIG. 2 (prior art) shows another solution for HID lamp ballast. Lamp 3 is driven by a high frequency signal generated by a half-bridge inverter (Q7, Q8). Ignition is accomplished by resonant circuit Cr and Lr. In order to ignite the lamp, the half-bridge inverter is driven by a frequency that is slightly higher than the resonant frequency $f_r$:

$$f_r = \frac{1}{2\pi\sqrt{L_r C_r}}$$

The resonant circuitry generates a high voltage across Cr, which ignites lamp 3. Once lamp 3 is ignited, the frequency of the drive signal is changed to $f_s$ in order to maintain the required magnitude of the lamp's current. The circuit's configuration shown in FIG. 2 is simpler and less expensive than the circuit's configuration shown in FIG. 1, and the transistors (i.e., in FIG. 2) are 'soft-switched' (i.e., switched under zero-voltage condition). However, the configuration shown in FIG. 2 suffers from several drawbacks. One drawback is associated with acoustic resonance, which usually develops within the cavity of the lamp whenever HID lamps are driven by high-frequency signals. Acoustic resonance normally causes arc instability, rupture/collapse of the arc and even explosion of the lamp. Although several methods have been suggested to overcome the acoustic resonance problem, for example frequency modulation and automatic frequency shifts, none of them has proven to be efficient for various types of lamps.

According to one aspect, the bridge depicted in FIG. 2, comprising Q5 to Q8, is driven by utilizing a combination of high and low frequency signals. For example, during the period of the first half of each cycle of the low-frequency signal, Q8 is switched into its conductive state, while Q5 and Q6 are driven by the high-frequency signal. Accordingly, the lamp current originates from Q5 and Q6. During the period of the second half of each cycle of the low-frequency signal, Q6 is switched into its conductive state, and Q7, Q8 are driven by the high-frequency signal, causing the lamp current to flow in opposite direction. Therefore, by utilizing this type of control method, the lamp can be driven, during its normal operating state, by a low frequency current. However, the latter control method has a drawback, being associated with the complicated control circuitry that is required for such implementation. In addition, the latter control method involves utilizing four power switches, which is another drawback. Furthermore, as would be apparent to a person skilled in the art, the latter power switches are switched under hard switching conditions (i.e., switched under excessive voltage), thereby causing to significant switching losses.

Another major drawback of the ballast shown in FIG. 2 is associated with the fact that the resonant circuit, used to generate the high voltage for ignition, is driven by a voltage source (the bus capacitor CBUS). Whenever the drive frequency is close to resonance frequency, the resonant circuitry (i.e., Lr and Cr) introduces essentially a zero ohmic resistance. Consequently, very high currents may develop, which may damage the apparatus. Accordingly, a special protection circuitry is required, that will allow providing to the lamp the high voltage that is required for its proper ignition, while guarantying that the resonant current is maintained at safe magnitude.

Another major drawback of the ballast shown in FIG. 2 is associated with 'hot ignition' phase of the lamp. The practical maximum voltage that is developed by a resonant circuit, such as shown in FIG. 2, (Lr, Cr), is insufficient for igniting hot HID lamps (i.e., 'hot ignition'), because hot ignitions involve delivering to the lamp very high instantaneous voltages, i.e., between 15 kV and 45 kV. Therefore, an extra ignitor is required for generating the high voltage. Such extra ignitors are affiliated into conventional apparatuses as extra modules, which are placed in series with the lamp, causing additional complications and cost.

All of the methods described above have not yet provided a simple and efficient way for providing to an HID lamp the optimized power required for its ignition phase, whether 'cold ignition' or 'hot ignition', as well as for its normal (i.e., 'steady-state') operation.

There is thus a widely recognized need for electronic ballast for HID lamps that will have less power switches and will produce a low frequency AC current to drive the lamp. It would be also desirable that the same circuit be capable of producing the high-voltage required for the lamp's ignition phase, while self-regulating the maximum current of the power switches during ignition. It would be also advantageous to have an apparatus, which would be capable of generating the high voltage that is required also for hot-ignitions of HID lamps.

It is an object of the present invention to provide a method and apparatus for providing low-frequency AC current to electric loads, such as HID lamps, with improved efficiency.

It is another object of the present invention to provide a method and apparatus for providing efficient AC 'cold'/'hot-ignition' current that are required to the operation of electric loads.

It is yet another object of the present invention to provide low-frequency AC current to electric loads, using soft switching.

It is still another object of the present invention to extend the reliability of electric loads, such as HID lamps.

Other objects and advantages of the invention will become apparent as the description proceeds.

SUMMARY OF THE INVENTION

The present invention is directed to a high frequency AC current source driven inverter, for providing, to an electric load, a low frequency AC current. The inverter includes a current splitting inductor, for splitting the high frequency AC current source into two high frequency AC current sources, a rectifier, for generating two DC current sources, by rectifying the resulted two high frequency current sources and a commutator, for generating a low frequency AC current from the resulted DC current sources. In some cases, loads, for example an HID lamp, may require an iginition phase. Accordingly, the inverter may also include a resonant circuitry, for generating a high voltage that is needed for ignition of such loads. In addition, a very high voltage spiker may be included in the low frequency inverter, which is fed from the above-mentioned resonant circuitry, for 'hot' ignition of an HID lamp. An additional feature of present invention is that all power switches included in the inverter are soft switched in order to essentially eliminate switching losses.

Preferably, the inverter comprises:
a) a current splitting inductor, for generating a first and a second high-frequency AC current sources;
b) a rectifier, coupled to the splitting inductor and consisting of rectifying diodes. The rectifier is utilized for rectifying the first and second high-frequency current sources. In addition, the rectifier may include two capacitors, in order them to be charged by the rectifier's diodes. These capacitors may be utilized as corresponding first and second DC current sources;
c) a controllable half-bridge commutator having first and second control inputs. The commutator may be coupled to the DC current sources, in order to commutate them, for allowing to generate, from the DC current sources, the low-frequency AC current that is required for driving the electric load; and
d) control circuitry, having first and second outputs. The outputs may be coupled to the first and second control inputs, respectively, and may output two complimentary pulse trains, each of which having a frequency that is automatically adjusted according to the operating condition of the electric load, for controlling the switching time of the commutator, thereby causing said commutator to alternately change the direction of the current passing through the said electric load.

The electric load might be a High Intensity Discharge (HID) lamp, or an electric motor. In the latter case, the torque and rotating speed of the motor will be controlled by the magnitude of the current and by the switching frequency of the commutator, respectively.

According to one embodiment of the present invention, the rectifier is implemented by utilizing diodes in a 'full-bridge' or 'half-bridge' configuration and the half-bridge commutator is implemented by utilizing first and second controllable switching means, which may be alternately switched from conductive state to non-conductive state. According to one aspect, the controllable switching means are transistors.

According to one aspect, the inverter may include a resonant ignition circuit, for generating the voltage required for 'cold-ignition' of the HID lamp.

Preferably, the resonant ignition circuit may comprise:
a) a capacitance, which is coupled in parallel to the HID lamp; and
b) an inductor, which is connected in series with respect to the lamp, and form with the capacitance a serial resonant circuitry. The resonance frequency of the serial resonance circuitry is selected to be higher than the operating frequency of the current passing through the HID lamp.

According to another aspect, the inverter may further comprise an ignition circuitry, for generating the high voltage required for 'hot-ignition' of the HID lamp.

Preferably the ignition circuitry may comprise:
a) an autotransformer (Lr), having one of its portions connected in series with the resonant ignition circuitry, The inductor of the resonant ignition circuitry is the secondary side of a transformer and part of the resonant ignition circuitry. The primary side of the transformer has a first contact that is coupled to a first end of a capacitor. According to one aspect, the autotransformer is implemented by a transformer having first and second windings. The first and second windings are utilized, in this case, as the first and second portions, respectively;
b) a spark gap (SPRK), having one of its ends coupled to a second end of the primary side. The second end of the SPRK may be coupled to a second end of the capacitor. The SPRK introduces a high impedance (essentially infinite) whenever the voltage across it is lower than a predetermined value (commonly referred to as 'breakdown' value), and a momentarily low (essentially zero) impedance whenever the voltage across it exceeds said 'breakdown' value; and
c) a rectifier, which may be fed by a second portion of the autotransformer, for allowing the energy, required for hot-ignition, to be stored in the capacitor. The stored energy may be forwarded to the secondary side of the transformer, whenever said SPRK introduces a low impedance, thereby allowing to obtain the voltage required for hot-ignition of the lamp. According to one aspect, the rectifier is a voltage doubler.

The operating condition, under which the lamp may operate, is the cold, or hot, ignition phase, in which case the frequency of the pulse trains is close to the resonance frequency of the Resonant Ignition circuitry, or an intermediate phase, in which case the frequency of the pulse trains gradually decreases (sweeps), or the normal state, in which case the frequency of the pulse trains is relatively low, and essentially constant.

According to one aspect, the current splitting inductor is implemented by an autotransformer, for allowing utilizing a relatively low AC voltage source, or, according to another aspect, the current splitting inductor is implemented by a transformer, for allowing isolation between the signal source side and the load side.

According to one aspect, the high-frequency AC current source is implemented by utilizing a high-frequency half-bridge inverter, which is placed between a DC voltage source and the current splitting inductor.

Preferably, the high-frequency half-bridge inverter comprises:
a) a capacitor, having its first contact coupled to an input contact of the current splitting inductor, for blocking DC signals;
b) an inductor, having its first contact coupled to a second contact of the capacitor, for limiting the input current of said current splitting inductor; and
c) a third and a forth controllable switching means (Q11, Q12), which are coupled to each other by their corresponding first contact, and to the DC voltage source by their corresponding second contact. The first contacts of the controllable switching means are coupled to a second contact of the inductor, for allowing generating the high frequency of the AC current source. The high frequency of the AC current source is essentially higher than a resonance frequency caused by the capacitor and the inductor, for allowing soft-switching the third and forth controllable switches.

According to one aspect, the high-frequency AC current source is implemented by utilizing a Current-Sourcing Push-Pull Parallel Resonant Inverter (CS-PPRI), which is placed between a DC voltage source and the current splitting inductor.

Preferably, the Current-Sourcing Push-Pull Parallel Resonant Inverter (CS-PPRI) comprises:
a) a transformer, the primary side of which including first and second input inductors. The secondary side of the transformer is utilized as the current splitting inductor;
b) a first Inductor (Lc), having its first contact coupled to a first contact of the first input inductor, and its second contact coupled to a first contact of the second input inductor;
c) a resonant Capacitor (Cc), having its first contact coupled to a second contact of the first input inductor, and its second contact coupled to a second contact of the second input inductor. The resonant capacitor (Cc), the first input Inductor (Lc) and the input inductors form a Parallel Resonant Circuitry (PRC), for allowing generating an alternating current source;
d) a second Inductor (Lin), having a first contact that could be connected to a DC power source and a second that may be connected to a middle contact of said first Inductor (Lc). The inductance of the second Inductor (Lin) is larger than the inductance of the first Inductor (Lc), for allowing the second Inductor (Lin) to generate the current required for driving the PRC;
e) a first controllable switch (Q12), having its first contact coupled to the first contact of the capacitor, and its second contact coupled to ground;
f) a second controllable switch (Q13), having its first contact coupled to the second contact of the capacitor, and its second contact coupled to the ground; and
g) a Soft Switching Controller (SSC), for soft switching the second and third switches (Q12, Q13). The input of the SSC is fed with a signal that represents the instantaneous magnitude of the signal at the second contact of the second Inductor (Lin), and the SSC generates two complementary trains of digital signal. One of the trains may be fed to an input terminal of the second switch (Q12) and the second train may be fed to an input terminal of the third switch (Q13). The trains cause the corresponding switches to alternately switch from conductive to non-conductive state, in synchronization with the instants at which the instantaneous magnitude reaches essentially a zero value. Only one switch may be in its conductive state at a given time.

According to one aspect, the high-frequency AC current source is implemented by utilizing an input circuitry in a Flyback configuration. The input circuitry is placed between a DC voltage source and the current splitting inductor.

Preferably, the Flyback configuration comprises:
a) a transformer, the primary side of which is an input inductor (L1). The input inductor could be connected, by one of its contacts, to a DC power source. The secondary side of the transformer is the current splitting inductor; and
b) a controllable switch (Q14), having its first contact coupled to a second contact of the input inductor (L1). The second contact of the controllable switch may be coupled, via a resistor, to ground. Whenever the controllable switch is in its conductive state, it causes the input inductor (L1) to store energy, and, whenever the controllable switch is in its non-conductive state, at least some of the stored energy is forwarded to the current splitting inductor.

The high-frequency half-bridge inverter, Current-Sourcing Push-Pull Parallel Resonant Inverter (CS-PPRI) and the Flyback configuration may further include a current feedback circuitry, for controlling the current passing through the HID lamp.

Preferably, the current feedback circuitry comprises:
a) first and second windings of a current transformer. Each of the windings may be connected in series with the corresponding first and second high-frequency current sources, for sampling the current passing through the corresponding current source;
b) a rectifier, for generating a first signal that represents the rectified sampled currents;
c) a first amplifier, having at least one reference input, which is connected to a constant reference value. The first amplifier also has a signal input, to which the first signal is forwarded, for generating an error signal that represents the deviation of the first signal from the reference value; and
d) a current mode PWM (Pulse Width Modulation) modulator, having a first input, to which the error signal is forwarded, and a second input, to which a second signal, representing the current of the high-frequency AC current source, is fed. The PWM modulator also has at least one output, for outputting a corresponding train of pulses, the duty-cycle of which is a function of the error signal and of the second signal, and is connected to the corresponding driver, the output of which is coupled to the corresponding controllable switch, for controlling its switching time, for causing the current passing through the HID lamp to be at the required value, thereby completing the feedback.

Alternately, the PWM modulator may be a voltage mode PWM controller, in which case the second input accepts a periodical ramp as a reference signal. The parameters of the periodical ramp, being at least the cycle duration and ramp's slope, could be determined so as to optimize the operation of the apparatus.

The inverter may further include a voltage feedback circuitry, for allowing clamping the voltage across the HID lamp, whenever the lamp is in its "off" state, and increasing the current of the lamp during its 'warm-up' period.

Preferably, the voltage feedback circuitry comprises:

a) a sampling circuitry, for sampling a voltage that represents the voltage across the lamp;

b) a second amplifier, having an input, to which the sampled voltage is forwarded, for generating a third signal. The third signal is added to the first signal and is essentially zero whenever the lamp is in its ignition phase, for allowing providing, to the lamp, a relatively increased current, while the lamp is in its 'warm-up' stage and the voltage across it is relatively low. The third signal is essentially proportional to the voltage across the lamp while the lamp is in its normal operating state, for allowing to decrease the (increased) current to the required operating value; and c) a third amplifier, having an input, to which the voltage representing the voltage across the lamp is forwarded, for generating a fourth signal. The fourth signal is forwarded to the first amplifier and is essentially large whenever the lamp is in its 'off'—state, or there is no lamp connected to the apparatus, for allowing clamping the voltage on the lamp to a safe level. The fourth signal is essentially zero while the lamp is in its ignition phase or in its normal operating state, for allowing the lamp's current to reach the required operating value.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

The present invention is directed to a low frequency inverter fed by a high frequency alternating current.

Figure 1:
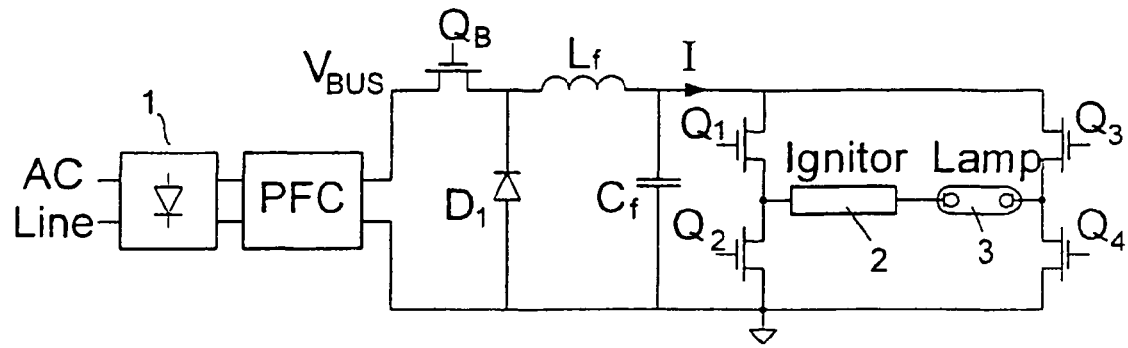
FIG. 1 (prior art) illustrates a low-frequency electronic ballast for HID lamps.
Figure 2:
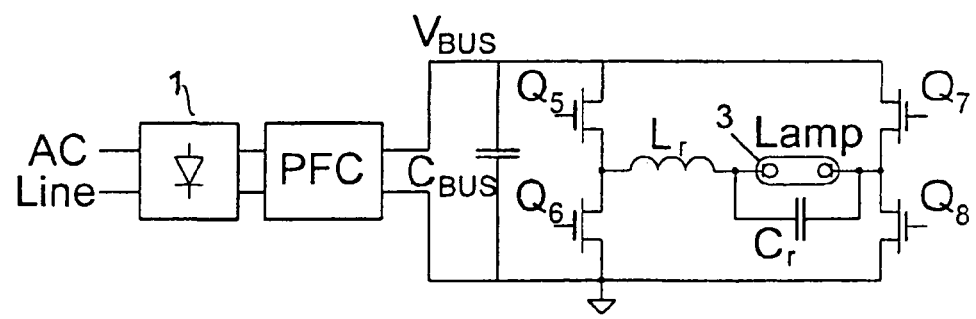
FIG. 2 (prior art) illustrates a high-frequency electronic ballast for HID lamps.
Figure 3:
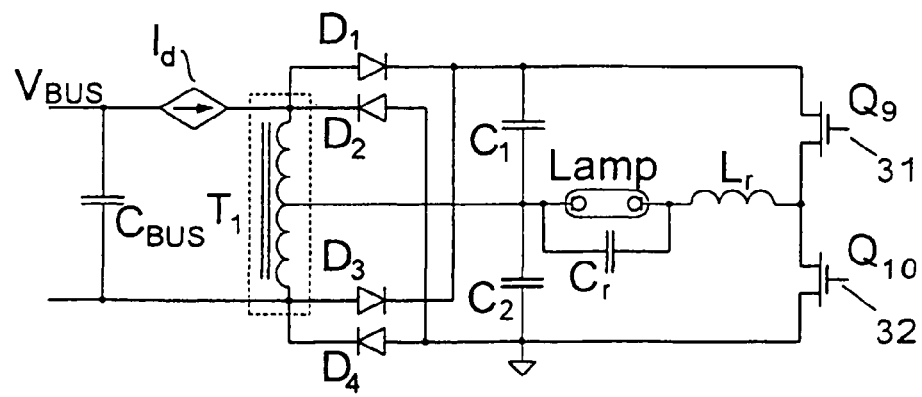
FIG. 3 illustrates two-transistor inverter and resonant ignitor, according to a preferred embodiment of the present invention.
Figure 13:
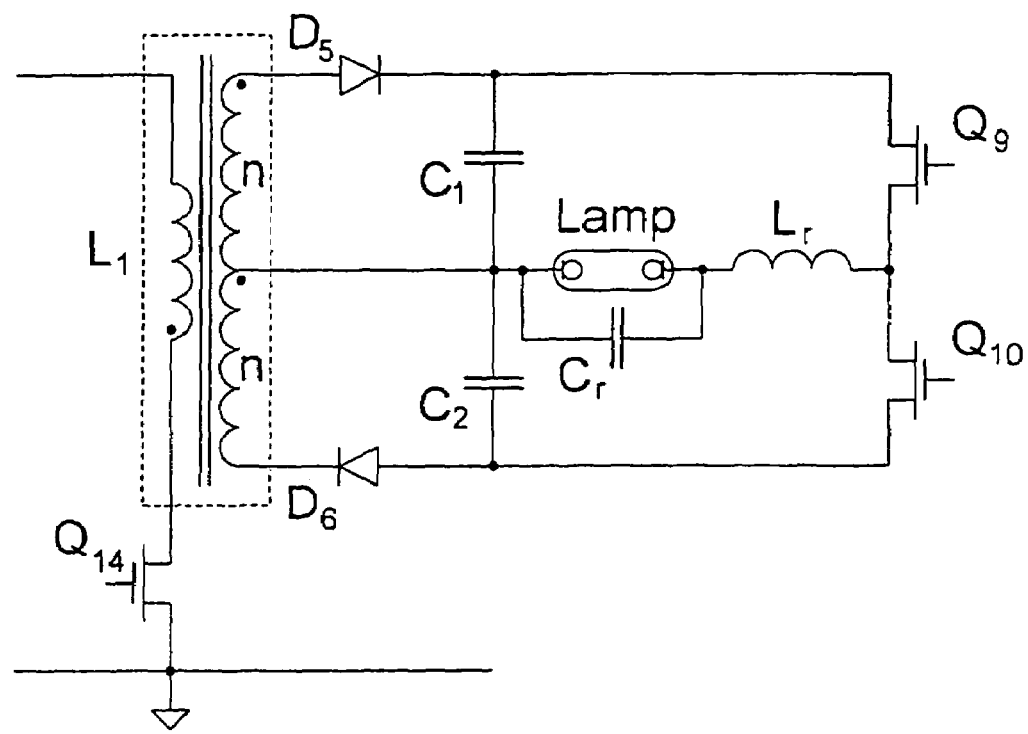
FIG. 13 illustrates a flyback realization of the current source Id shown in FIG. 3, according to a preferred embodiment of the present invention.
Figure 14:
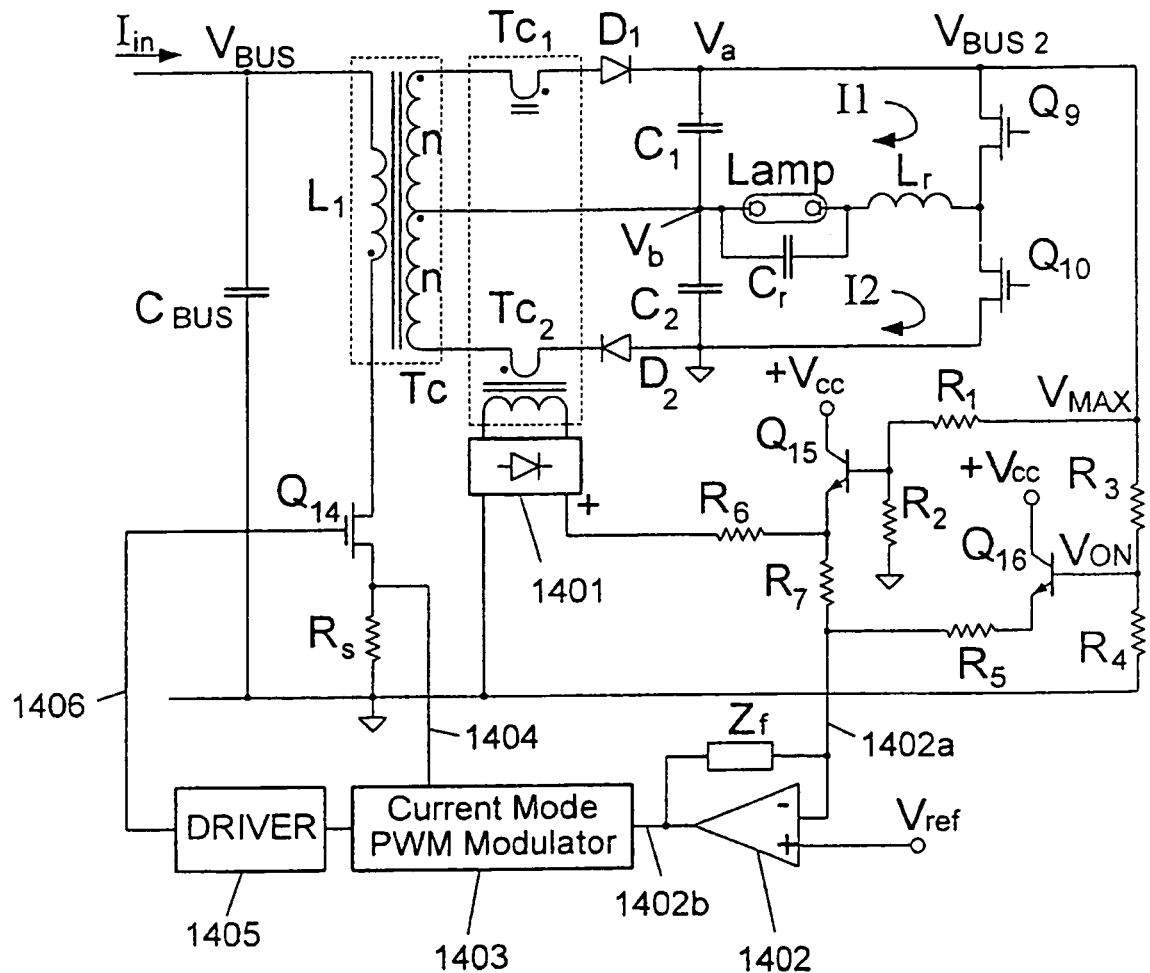
FIG. 14 illustrates a control circuit of the circuit shown in FIG. 13, according to a preferred embodiment of the present invention.

FIG. 3 illustrates a two-transistor inverter and resonant ignitor, according to a preferred embodiment of the present invention. T1 is an autotransformer that is utilized as a current splitting inductor. T1 is driven by a high frequency current source Id. Inductor T1 is split into two portions, thereby forming two corresponding high frequency AC current sources. The two high frequency AC current sources are followed by a 'full-wave' rectifier, comprising rectifying diodes D1 to D4 that rectify the corresponding AC current sources, and two capacitors (i.e., C1 and C2). The resulted rectified (DC) currents (i.e., generated by C1 and C2) are then forwarded to a controllable half-bridge commutator, which comprises controllable power switches. In FIG. 3, the controllable power switches are power transistors Q9 and Q10. The DC current sources are commutated, by the commutator, for allowing to generate, from the resulted DC current sources, the low-frequency AC current required for driving the electric load. The rectifier could be implemented by a 'half-bridge' configuration, as illustrated in FIGS. 13 and 14.

A control circuitry (not shown), having two output, is utilized for controlling the operation of the controllable commutator (Q9, Q10), by providing to the commutator's inputs (i.e., 31 and 32) two complimentary pulse trains. The frequency of the pulse trains is automatically adjusted according to the conditions (i.e., 'cold'/'hot' ignition, intermediate state, normal operating state) of the electric load, in order to control the switching time of the commutator, thereby causing the commutator to alternately change the direction of the current passing through the electric load, which might be a High Intensity Discharge (HID) lamp. Additionally, a current and/or voltage feedback circuitry could be utilized, for controlling the current and controlling, or clamping, the voltage across the load. An exemplary feedback circuitry is shown in FIG. 14.

The current passing through the lamp (when ignited) is a symmetrical square wave AC current. Under normal operating conditions (i.e., in a steady state), the drive frequency of Q9 and Q10 is kept low in order to maintain the lamp under safe operating condition. During the ignition phase, Q9 and Q10 are driven by a relatively high frequency signal, i.e., just above the resonance frequency as determined by the serial resonant ignition circuitry that comprises Cr and Lr. The latter signal generates a high voltage across Cr, which is connected in parallel to the lamp, the power of which is sufficient for cold ignition of the HID lamp. An optional drive sequence, for driving the inverter stage of FIG. 3, is shown in FIG. 4.

Of course, the autotransformer T1 shown in FIG. 3 could be replaced by a transformer, as shown in FIGS. 10 to 14, for providing isolation between the signal source side and the load side. In addition, the high frequency current source could be implemented by utilizing a high frequency half-bridge inverter, such as the inverter shown in FIG. 11, or, alternately, by utilizing a Current-Sourcing Push-Pull Parallel Resonant Inverter (CS-PPRI), such as the inverter shown in FIG. 12, or, alternately, by utilizing an input circuitry in a Flyback configuration, such as the inverter shown in FIGS. 13 and 14.

Figure 4:
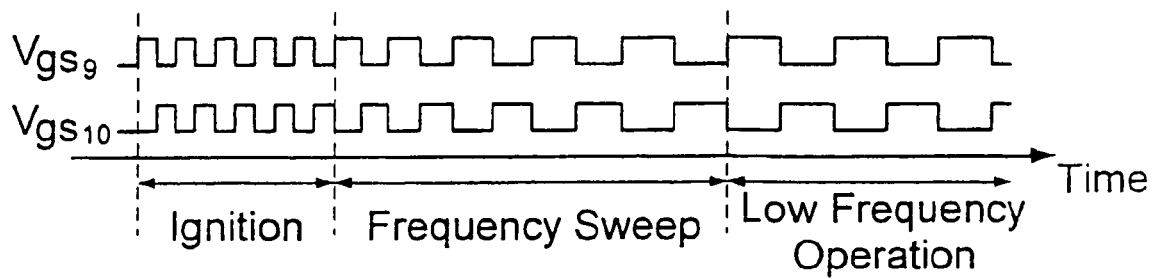
FIG. 4 illustrates a typical drive sequence for the circuit of FIG. 2, which includes ignition phase, frequency sweep and normal operating frequency.

In FIG. 4, during ignition phase, the frequency of the driving pulses is close to the resonance frequency of Lr, Cr. After the lamp is ignited, the frequency of the driving pulses gradually decreases ('sweeps') until the nominal low operating frequency is reached. As is apparent in FIG. 4, whenever Q9 is in its conductive state (i.e., Vgs9 is at binary "high") state), Q10 is in its non-conductive state (i.e., Vgs10 is at binary "low" state), and vise versa. Additionally, transistor Q9 is at its conducting state when the input current is positive, as well as when the input current is negative (i.e., at different periods). Likewise, transistor Q10 is at its conducting state when the input current is positive, as well as when the input current is negative (i.e., at different time). Obviously, Q9 and Q10 are not in their conductive state at the same time. Accordingly, and in order to facilitate the understanding of its operation, the circuit of FIG. 3 is functionally 'split' into the corresponding parts, as described in FIGS. 5 to 8.

Figure 5:
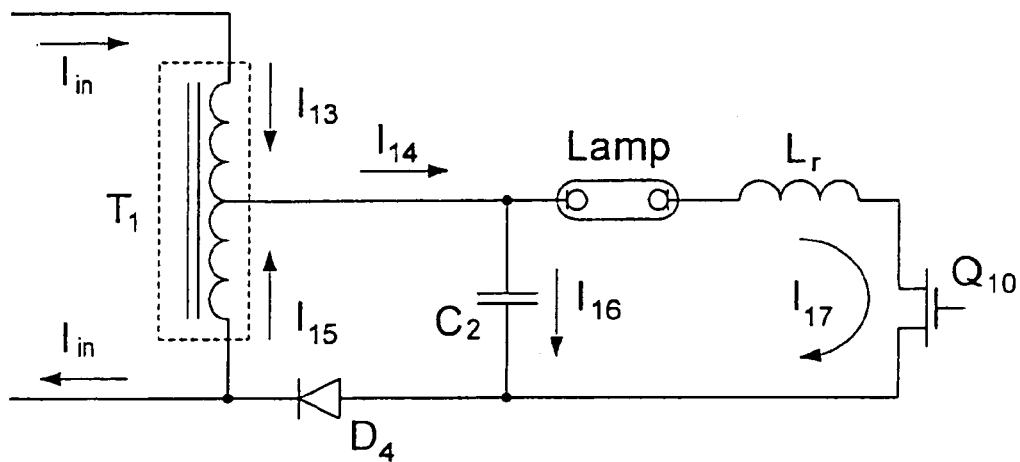
FIG. 5 depicts a part of the circuit of FIG. 3, illustrating the current paths when Q10 is conducting and the input current Iin is positive, according to a preferred embodiment of the present invention.
Figure 6:
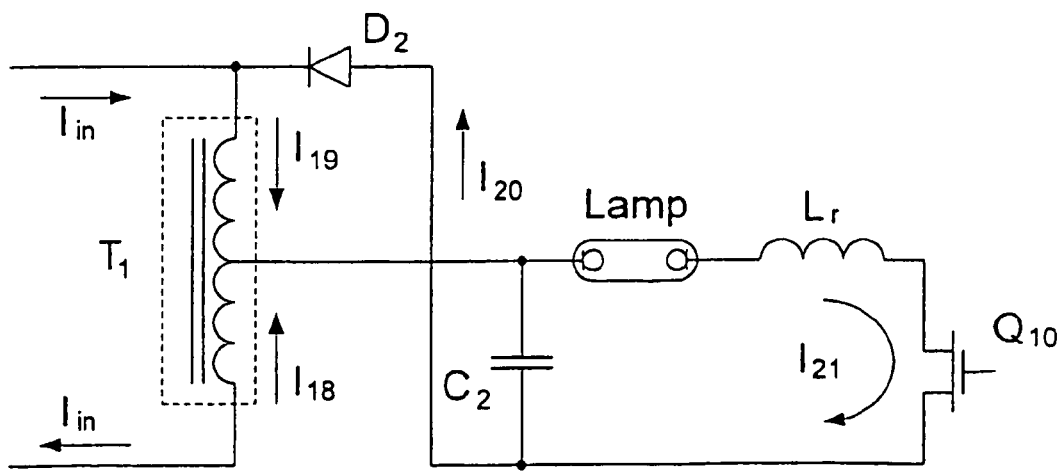
FIG. 6 depicts a part of the circuit of FIG. 3, illustrating the current paths when Q10 is conducting and the input current Iin is negative, according to a preferred embodiment of the present invention.

FIGS. 5 and 6 illustrate the current path when Q10 is in its conductive state, while Q9 is in its non-conductive state, and the input current Iin is rectified by a full-bridge comprising diodes D4 and D2, respectively, according to a preferred embodiment of the present invention. I17 is associated with the positive cycles of input current Iin, and I21 is associated with the negative cycles of input current Iin. I17 and I21 have the same first direction with respect to lamp Lamp.

Figure 7:
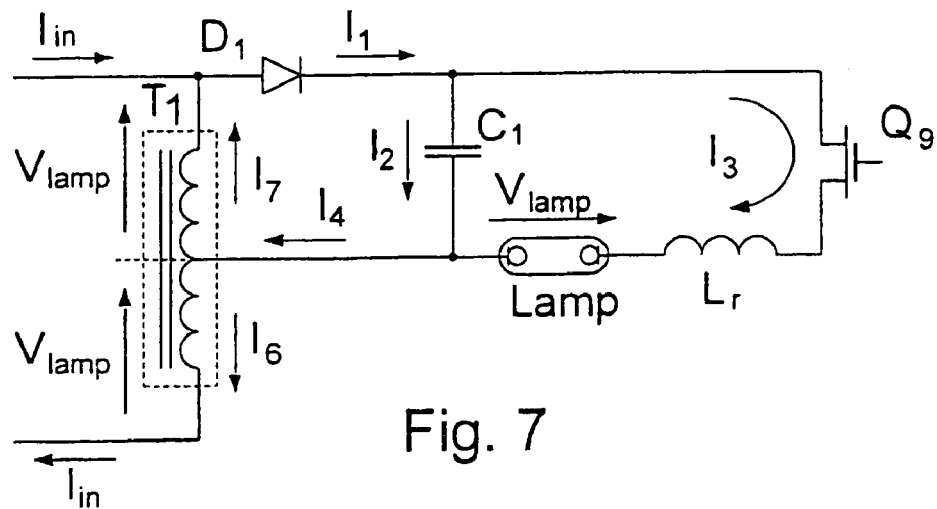
FIG. 7 depicts a part of the circuit of FIG. 3, illustrating the current paths when Q9 is conducting and the input current Iin is positive, according to a preferred embodiment of the present invention.
Figure 8:
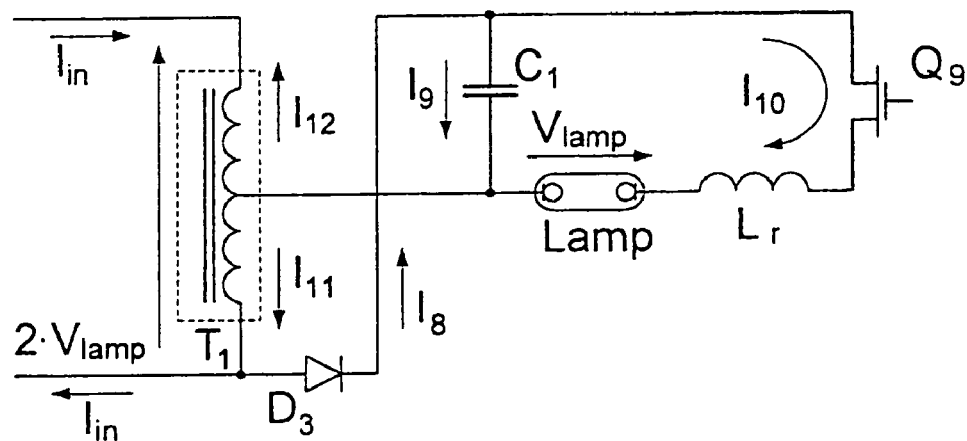
FIG. 8 depicts a part of the circuit of FIG. 3, illustrating the current paths when Q9 is conducting and the input current Iin is negative, according to a preferred embodiment of the present invention.
Figure 16:
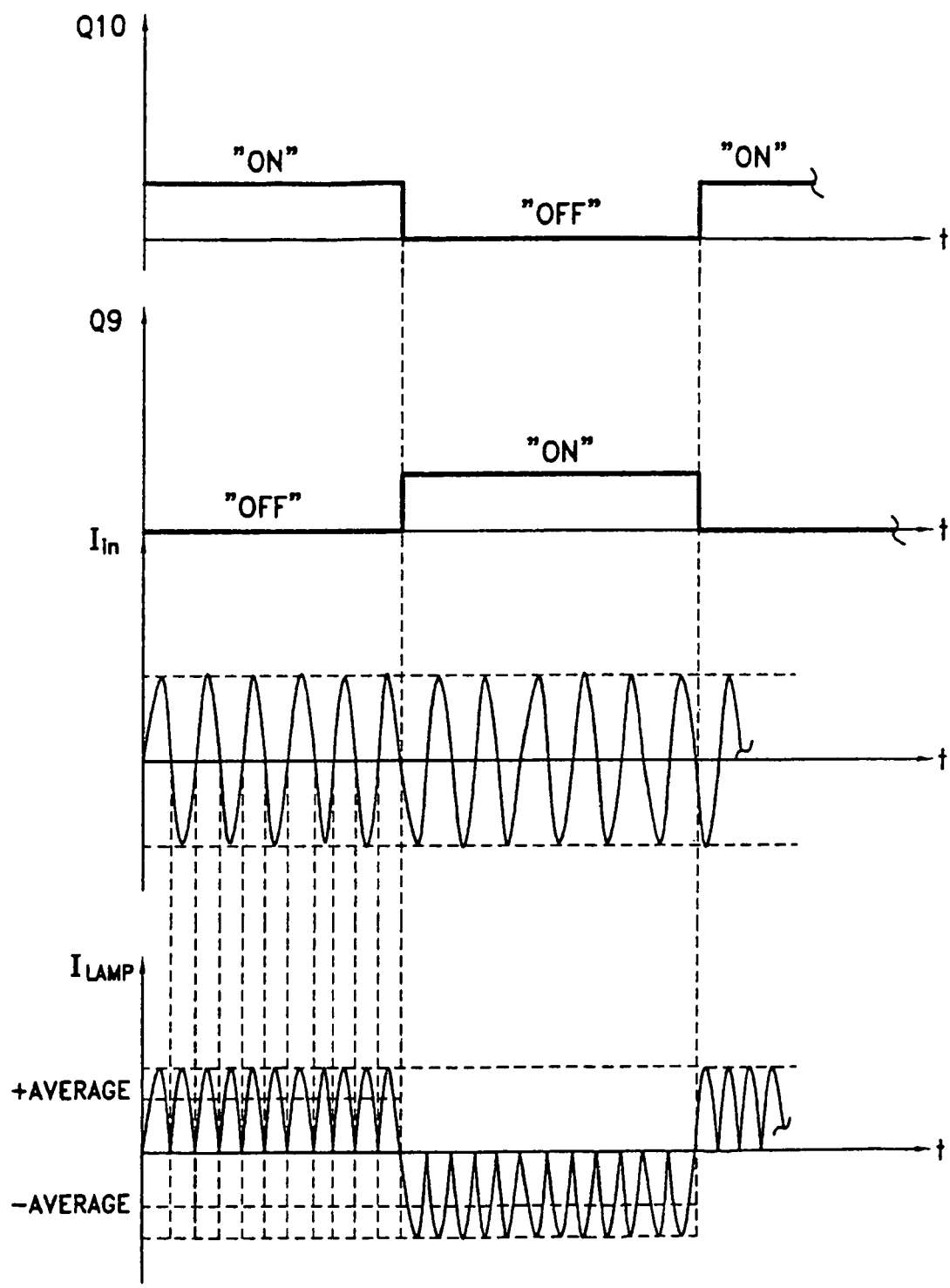
FIG. 16 illustrates typical waveforms of signals associated with the circuit shown in FIG. 3.

FIGS. 7 and 8 illustrate the current path when Q9 is in its conductive state, while Q10 is in its non-conductive state, and the input current Iin is rectified by a full-bridge comprising diodes D1 and D3, respectively, according to a preferred embodiment of the present invention. I3 is associated with the positive cycles of input current Iin, and I10 is associated with the negative cycles of input current Iin. I3 and I10 have the same second direction with respect to lamp Lamp, which differs from the first current(s) direction, thereby obtaining the effect of alternating current that passes through the lamp, as required. In addition, the operating frequency of the lamp is the switching frequency at which Q9 and Q10 are switched from conductive state to non-conductive state, and the switching frequency is relatively low. The resulted waveforms of the signals associated with the circuit shown in FIGS. 5 to 8 are depicted in FIG. 16.

The low frequency inverter shown in FIG. 3 has at least the following advantages:
a) The size of transformer T1 is relatively small due to the high frequency condition under which it operates.
b) the current passing through the load (i.e., Lamp) is a low frequency AC current.
c) generating the required ignition voltage is obtained by adding resonant network (i.e., Lr and Cr), and by driving the corresponding half-bridge diodes with a signal having a frequency that is slightly above the frequency of said resonant network.
d) the current through the switches (i.e., Q9 and Q10) is limited to the input current Id. Therefore, no excessive current is developed in the circuit, in contradiction to the prior art configurations.

Figure 9:
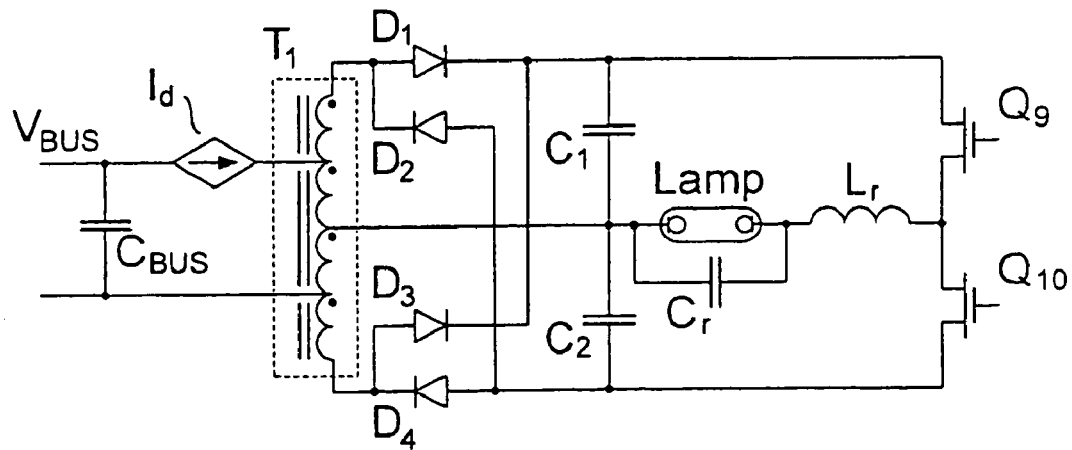
FIG. 9 illustrates implementing the circuit of FIG. 3 with an autotransformer, according to a second embodiment of the present invention.

FIG. 9 illustrates implementing the circuit of FIG. 3 with an autotransformer, according to one aspect of the present invention. Transformer T1 shown in FIG. 3 has been replaced by autotransformer T1 in FIG. 9, to allow utilizing a relatively low input voltage (i.e., $V_{BUS}$).

Figure 10:
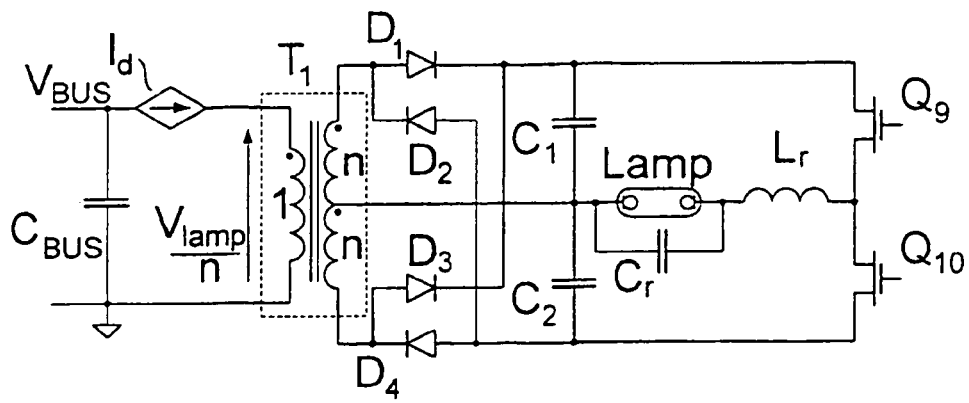
FIG. 10 illustrates implementing the circuit of FIG. 3 with a transformer, according to a second embodiment of the present invention.

FIG. 10 illustrates implementing the circuit of FIG. 3 with a transformer, according to a third aspect of the present invention. Transformer T1 shown in FIG. 3 has been replaced by transformer T1 in FIG. 10, which is built as a multi-winding magnetic element allowing galvanic isolation between the input side and the output side.

Figure 11:
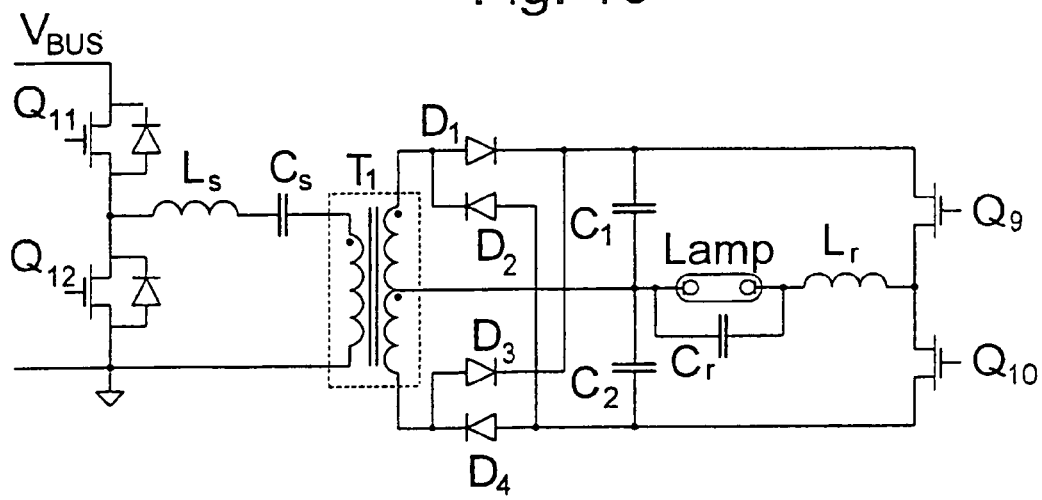
FIG. 11 illustrates half-bridge realization of the current source Id shown in FIG. 3, according to a preferred embodiment of the present invention.

FIG. 11 illustrates half-bridge realization of the high frequency current source Id shown in FIG. 3, according to another aspect of the present invention. The current driver comprises a high frequency half-bridge driver (Q11, Q12). Ls limits the current and Cs blocks the DC component of the current. As may be appreciated by those skilled in the art, Q11 and Q12 may be 'soft-switched' by operating the half-bridge driver at a frequency that is slightly above the resonant frequency of Ls, Cs, and by employing a zero-cross based controller.

Figure 12:
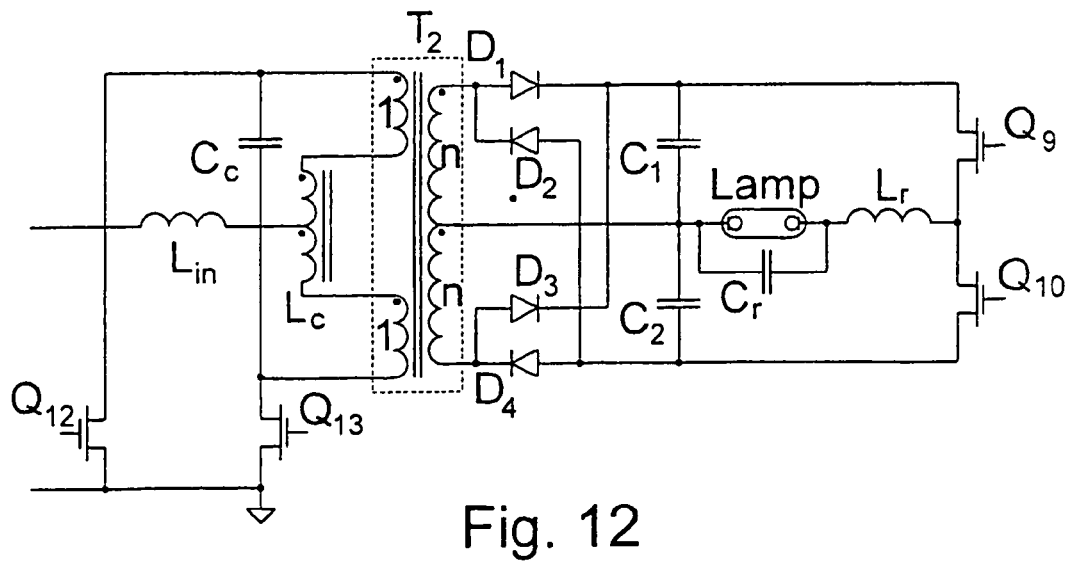
FIG. 12 illustrates sourcing push pull resonant inverter realization of the current source Id shown in FIG. 3, according to a preferred embodiment of the present invention.

FIG. 12 illustrates Current-Sourcing Push-Pull Parallel Resonant Inverter (CS-PPRI) realization of the current source Id shown in FIG. 3, according to a another embodiment of the present invention. The CS-PPRI circuit is particularly relevant in cases wherein low input voltage is required, such as in cases wherein batteries are utilized for powering the apparatus. Accordingly, a CS-PPRI-based apparatus will be particularly useful for powering HID headlight lamps in automotive applications.

Switches Q12 and Q13 are controlled by a Soft Switching Controller (not shown), which accepts at its input a signal (not shown) which represents the instantaneous magnitude of the signal at the middle point of Lc, and generates two complimentary trains (not shown) of digital signals (i.e., pulses), each of which is fed to the corresponding switch (Q12, Q13). These trains cause the switches Q12, Q13 to alternately switch from their conductive state to their non-conductive state in synchronization with the instants at which the instantaneous magnitude reaches essentially a zero value. Only one switch could be in its conductive state at a given time.

FIG. 13 illustrates a flyback realization of the current source Id shown in FIG. 3, according to a preferred embodiment of the present invention. The current splitting element is a coupled inductor (L1) that is part of a flyback topology. Whenever Q14 is in its conductive state, energy is stored in L1 and, whenever Q14 is in its non-conductive state, L1 discharges at least some of its stored energy into the load. Current will flow via D5 or D6, depending on which transistor (i.e., Q9 or Q10, respectively) is in its conductive state.

FIG. 14 illustrates a control circuit for the circuit shown in FIG. 13, according to a preferred embodiment of the present invention. D1 and D2 are utilized for 'half-bridging' the current passing through Tc1 and Tc2, respectively, and, C1 and C2 are utilized for filtering out the corresponding high-frequency components and obtaining Va and Vb, respectively, which are essentially Direct-Current (DC) voltages. Switching Q9 to its conductive state (and Q10 to its non-conductive state) results in a current passing through the lamp in one direction (i.e., I1). Switching Q10 to its conductive state (and Q9 to its non-conductive state) results in a current passing through the lamp in the opposite direction (i.e., I2). Consequently, the current passing through the lamp is an alternating pulsed current, the frequency of which is the switching frequency of Q9 and Q10, which is relatively low frequency. Tc1 and Tc2 are utilized for allowing measuring the corresponding instantaneous currents passing through D1 and D2, which reflect the corresponding currents consumed by the lamp.

The control circuit, comprising full-bridge rectifier 1401, Q15, Q16, R1 to R7, amplifier 1402, PWM modulator 1403 and driver 1405, accepts three types of feedback signals, which are summed-up by R6, R7 and R5. The summation signal (1402*a*) is forwarded to amplifier 1402, which is utilized as comparator, for outputting error signal 1402*b* that is associated with the comparison result between the latter signal (i.e., 1402*a*) and a predetermined reference value Vref. R6 forwards (i.e., to amplifier 1402) a feedback signal that is associated with the current consumption of the lamp. R7 forwards a feedback signal that is associated with the maximum allowable voltage across the lamp during ignition phase (Vmax), and R5 forwards a feedback signal that is associated with the warm-up phase of the lamp.

In the ignition phase, or whenever there is no lamp connected to the apparatus, a relatively high voltage tends to develop. However, it is required to limit the allowable maximum voltage in order to maintain the apparatus under safe operating conditions. Accordingly, Q15 is utilized to limit the output voltage Vbus2. Whenever Vmax increases, the conductivity of Q15 increases, resulting in increased voltage being forwarded to amplifier 1402 via R7. Accordingly, the output current decreases to the (required) predetermined value, and the output voltage Vmax is thereby clamped to a safe level.

After the lamp ignites, a warm-up phase takes place, during which the voltage across the lamp is relatively low, in which case Von is also low, causing to Q16 to be in its non-conductive state. Consequently, a relatively high current is provided to the lamp, which complies with the required current during warm-up phase. The voltage across the lamp increases as the lamp becomes hotter, causing an increase in Von. Therefore, the conductivity of Q16 increases, causing an increase in the corresponding feedback that is forwarded to amplifier 1402, resulting in lowering the lamp's current to the desire normal operating level.

Error signal 1402*b* is forwarded to Current Mode Pulse Width Modulation (CMPWM) 1403, which accepts an additional signal, being representative of the current passing through the Flyback inductor L1 (i.e., the current of the high frequency AC current source). The task of CMPWM 1403 is to maintain the output current (which is the precursor of the current of the lamp) at the desired level, by adjusting the duty cycle of the driving signal 1406. The larger the error signal (1402*b*), the smaller the duty cycle, i.e., the smaller the periods at which Q14 is in its conductive state (and the smaller the energy that is forwarded to the lamp). Of course, the CMPWM could be replaced by a corresponding Voltage Mode Pulse Width Modulation (VMPWM), in which case the VMPWM would accept, as the additional signal, a signal that would represent the voltage across inductor L1.

As a lamp ages, the voltage across it increases. Providing a constant current to the lamp, regardless of the aging phenomenon, will cause the lamp to be overdriven. However, the apparatus shown in FIG. 14 solves this situation by increasing the current passing through R5 in response to the increased voltage across the lamp. A corresponding change in error signal 1402*b* will cause a corresponding decrease in the lamp's current.

Of course, the current feedback circuitry shown in FIG. 14 could be utilized by at least the configurations shown in FIGS. 11 and 12. Accordingly, each controllable switch, which is utilized for controlling the current of the high frequency AC source, is assigned a corresponding PWM output.

Figure 15:
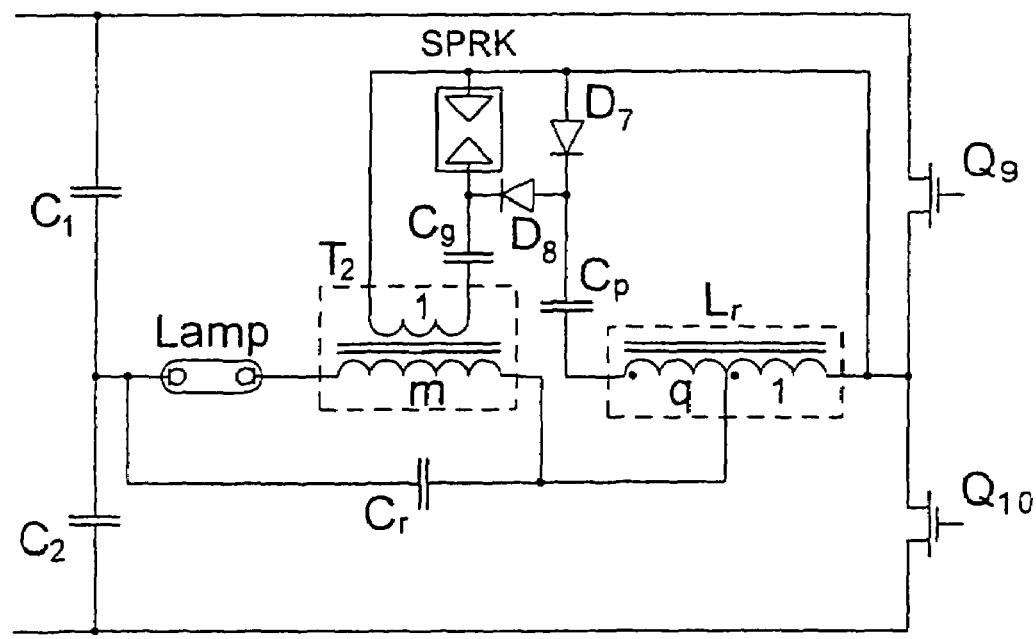
FIG. 15 illustrates incorporating a very high voltage spiker to the low frequency generator, according to a preferred embodiment of the present invention.

FIG. 15 illustrates incorporating a very high voltage ignitor to the low frequency inverter, according to one aspect of the present invention. The circuit generates a very high-voltage spike that is required for hot ignition (i.e., restart) of the lamp. The latter spike is obtained by an ignition circuitry that comprises Lr, which is utilized as an autotransformer for providing a high voltage, a rectifier (D7, D8, Cp, Cg) to which the high voltage is forwarded, and a spark gap SPRK, on which the resulted high voltage is employed, for causing it to introduce low impedance. Spark gap SPRK is essentially a voltage-dependent 'On-Off' switch, that is characterized by having a very high (essentially infinite) impedance whenever the voltage across it is lower than a predetermined value (commonly referred to as a 'breakdown voltage'), and very low (essentially zero) impedance whenever the voltage across it momentarily exceeds said breakdown voltage.

Accordingly, whenever the voltage across Cg reaches the breakdown voltage of the spark gap, the spark gap 'collapses' (i.e., its impedance being very low), causing the voltage across Cg to be forwarded to the primary side of pulse transformer T2. By choosing the proper turns-ratio of T2, the voltage-pulse fed to the lamp can be such that it complies with the required hot-start conditions. After completion of the hot-start phase, the operating frequency of the commutator (i.e., Q9 and Q10) is decreased, resulting in a decreased voltage, which is not sufficient for activating spark gap SPRK. Therefore, the spark gap remains, during the lamp's normal operation, in its "open" state, and disconnects the primary side of transformer T2.

Of course, the rectifier (D7, D8, Cp, Cg) may be implemented by a 'voltage doubler', and the autotransformer by a two-winding transformer, both are features that are known to those skilled in the art.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. Apparatus driven by high-frequency AC current source, for driving an electric load with low-frequency AC current, comprising:

a) a current splitting inductor, for generating, from said high-frequency current source, a first and a second high-frequency AC current sources;
b) a rectifier, coupled to said splitting inductor, consisting of rectifying diodes for rectifying said first and second high-frequency current sources, and capacitors, charged by said diodes, said capacitors being corresponding to a first and second DC current sources;
c) a controllable half-bridge commutator having a first and a second control inputs, said commutator being coupled to said DC current sources, for commutating said DC current sources, for allowing to generate, from said DC current sources, the low-frequency AC current required for driving said electric load; and
d) a control circuitry, having a first and a second outputs, said outputs being coupled to said first and second control inputs, respectively, and outputting two complimentary pulse trains, each of which having a frequency being automatically adjusted according to the operating conditions of said electric load, for controlling the switching time of said commutator, thereby causing said commutator to alternately change the direction of the current passing through said electric load.

2. Apparatus according to claim 1, in which the electric load is a High Intensity Discharge (HID) lamp, or an electric motor, the torque and rotating speed of which are controlled by the magnitude of the low-frequency AC current and by the switching frequency of the commutator, respectively.

3. Apparatus according to claim 2, further including a resonant ignition circuit, for generating the voltage required for cold-ignition of the HID lamp, comprising: a) a capacitance, being coupled in parallel to the HID lamp; and b) an inductor, being connected in series with respect to the lamp, said inductor forming a serial resonant circuit with said capacitor, wherein the resonant frequency of said serial resonant circuit is selected to be higher than the operating frequency of the current passing through said HID lamp.

4. Apparatus according to claim 2, further including an ignition circuitry, for generating the high voltage required for hot-ignition of the HID lamp, comprising:
a) an autotransformer (Lr), one portion of which being connected in series with said resonant ignition circuitry, the inductor of which being the secondary side of a transformer and part of said resonant ignition circuitry, the primary side of which having a first end coupled to a first end of a capacitor;
b) a spark gap (SPRK), one end of which being coupled to a second end of said primary side, and a second end of which being coupled to a second end of said capacitor, said SPRK introduces a high impedance whenever the voltage across it is lower than a predetermined breakdown value, and a momentarily low impedance whenever the voltage across it exceeds said breakdown value; and
c) a rectifier, being fed by a second portion of said autotransformer, for allowing the energy, required for hot-ignition, to be stored in said capacitor, said energy being forwarded to said secondary side, whenever said SPRK introduces a low impedance, thereby allowing to obtain the voltage required for hot-ignition of said lamp.

5. Apparatus according to claim 4, in which the autotransformer is implemented by a transformer having first and second windings, being the first and second portions, respectively.

6. Apparatus according to claim 4, in which the rectifier is a voltage doubler.

7. Apparatus according to claim 2, wherein the operating condition is the cold, or hot, ignition phase, during which the frequency of the pulse trains is close to the resonance frequency of the Resonant Ignition circuitry, or an intermediate phase, during which the frequency of the pulse trains gradually decreases, or the normal state, during which the frequency of the pulse trains is relatively low, and essentially constant.

8. Apparatus according to claim 2, further including a current feedback circuitry, for controlling the current passing through the HID lamp, comprising:
a) first and second windings of a current transformer, each of which being connected in series with the corresponding first and second high-frequency current sources, for sampling the current passing through the corresponding current source;
b) a rectifier, for generating a first signal being representative of the rectified sampled currents;
c) a first amplifier, having at least one reference input, being connected to a constant reference value, and a signal input, to which said first signal is forwarded, for generating an error signal representing of the deviation of said first signal from said reference value; and
d) a current mode PWM modulator, having a first input, to which said error signal is forwarded, a second input, to which a second signal, representing the current of the high-frequency AC current source, is fed, and at least one output, for outputting a corresponding train of pulses, the duty-cycle of which is a function of said error signal and of said second signal, and being connected to a corresponding driver, the output of which being coupled to the corresponding controllable switch, for controlling its switching time, for causing the current passing through the HID lamp to be at the required value, thereby completing said feedback.

9. Apparatus according to claim 8, in which the PWM modulator is a voltage mode PWM controller, and the second input accepts a periodical ramp signal as a reference signal, the parameters of said periodical ramp signal being at least the cycle duration and ramp's slope and being determined so as to optimize the operation of said apparatus.

10. Apparatus according to claim 2, further including a voltage feedback circuitry, for allowing clamping the voltage across the HID lamp, whenever said lamp is in its off state, and increasing the current of said lamp during its warm-up period, comprising:
a) a sampling circuitry, for sampling a voltage representing the voltage across said lamp;
b) a second amplifier, having an input, to which the sampled voltage is forwarded, for generating a third signal, to be added to the first signal and being essentially zero whenever said lamp is in its ignition phase, for allowing to provide, to said lamp, a relatively increased current, while said lamp being in its warm-up stage and the voltage across it being relatively low, said third signal being essentially proportional to the voltage across said lamp while said lamp being in its normal operating state, for allowing to decrease said increased current to the required operating value; and
c) a third amplifier, having an input, to which the voltage representing the voltage across said lamp is forwarded, for generating a fourth signal, said fourth signal being forwarded to the first amplifier and being essentially large whenever said lamp is in its off state, or there is no lamp connected to the apparatus, for allowing to clamp the voltage on said lamp to a safe level, said fourth signal being essentially zero while said lamp being in its ignition phase or in its normal operating state, for allowing the lamp's current to reach the required operating value.

11. Apparatus according to claim 1, in which the rectifier is implemented by utilizing diodes in a full-bridge or half-bridge configuration.

12. Apparatus according to claim 1, in which the half-bridge commutator is implemented by utilizing a first and a second controllable switching means, said switching means being, whenever desired, alternately switched from conductive state to non-conductive state.

13. Apparatus according to claim 12, in which the first and second controllable switching means are transistors.

14. Apparatus according to claim 1, wherein the current splitting inductor is implemented by an autotransformer, thereby allowing utilizing a relatively low AC voltage source.

15. Apparatus according to claim 1, wherein the current splitting inductor is implemented by a transformer, for allowing isolation between the signal source side and the load side.

16. Apparatus according to claim 1, in which the high-frequency AC current source is implemented by utilizing a high-frequency half-bridge inverter, being placed between a DC voltage source and the current splitting inductor, comprising:
a) a capacitor, a first contact of which being coupled to an input contact of the current splitting inductor, for blocking DC signals;
b) an inductor, a first contact of which being coupled to a second contact of said capacitor, for limiting the input current of said current splitting inductor; and
c) a third and a fourth controllable switching means (Q11, Q12), being coupled to each other by their corresponding first contact, and to said DC voltage source by their corresponding second contact, said first contact being coupled to a second contact of said inductor, for allowing generating the high-frequency of said AC current source, said high-frequency being essentially higher than a resonance frequency caused by said capacitor and said inductor, for allowing soft-switching said third and forth fourth controllable switches.

17. Apparatus according to claim 1, in which the high-frequency AC current source is implemented by utilizing a Current-Sourcing Push-Pull Parallel Resonant Inverter (CS-PPRI), being placed between a DC voltage source and the current splitting inductor, comprising:
a) a transformer, the primary side of which having a first and a second input inductors, and the secondary side of which being the current splitting inductor;
b) a first Inductor (Lc), a first contact of which being coupled to a first contact of said first input inductor, and a second contact of which being coupled to a first contact of said second input inductor;

c) a resonant Capacitor (Cc), a first contact of which being coupled to a second contact of said first input inductor, and a second contact of which being coupled to a second contact of said second input inductor, said resonant capacitor, first Inductor (Lc) and input inductors forming a Parallel Resonant Circuitry (PRC), for allowing generating an alternating current source;
d) a second Inductor (Lin), a first contact of which could be connected to a DC power source and a second contact of which being connected to a middle contact of said first Inductor (Lc), the inductance of said second Inductor (Lin) being larger than the inductance of said first Inductor (Lc), for allowing said second Inductor (Lin) to generate the current required for driving said PRC;
e) a first controllable switch (Q12), a first contact of which being coupled to said first contact of said capacitor, and a second contact of which being coupled to ground;
f) a second controllable switch (Q13), a first contact of which being coupled to said second contact of said capacitor, and a second contact of which being coupled to said ground; and
g) a Soft Switching Controller (SSC), for soft switching said second and third switches (Q12,Q13), the input of said SSC being fed with a signal representing the instantaneous magnitude of the signal at the second contact of said second Inductor (Lin), said SSC generates two complementary trains of digital signal, one of said trains being fed to an input terminal of said second switch (Q12) and the second train being fed to an input terminal of said third switch (Q13), for causing them to alternately switch from conductive to non-conductive state in synchronization with the instants at which said instantaneous magnitude reaches essentially a zero value, only one switch being in its conductive state at a given time.

18. Apparatus according to claim 1, in which the high-frequency AC current source is implemented by utilizing an input circuitry in a Flyback configuration, said circuitry being placed between a DC voltage source and the current splitting inductor, comprising: a) a transformer, the primary side of which being an input inductor (L1), a first contact of which could be connected to a DC power source, and the secondary side of which being the current splitting inductor; and b) a controllable switch (Q14), a first contact of which being coupled to a second contact of said input inductor (L1), and a second contact of which being coupled to ground, said controllable switch (Q14) causes said input inductor (L1) to store energy whenever said controllable switch being in its conductive state, and to forward at least some of the stored energy to said current splitting inductor whenever said controllable switch is in its non-conductive state.

* * * * *